Sept. 12, 1939.  A. R. THOMPSON  2,172,685
STACK DUMPER
Filed Oct. 13, 1936   2 Sheets-Sheet 1

INVENTOR.
Albert. R. Thompson.
BY
ATTORNEY.

Sept. 12, 1939. A. R. THOMPSON 2,172,685
STACK DUMPER
Filed Oct. 13, 1936 2 Sheets-Sheet 2
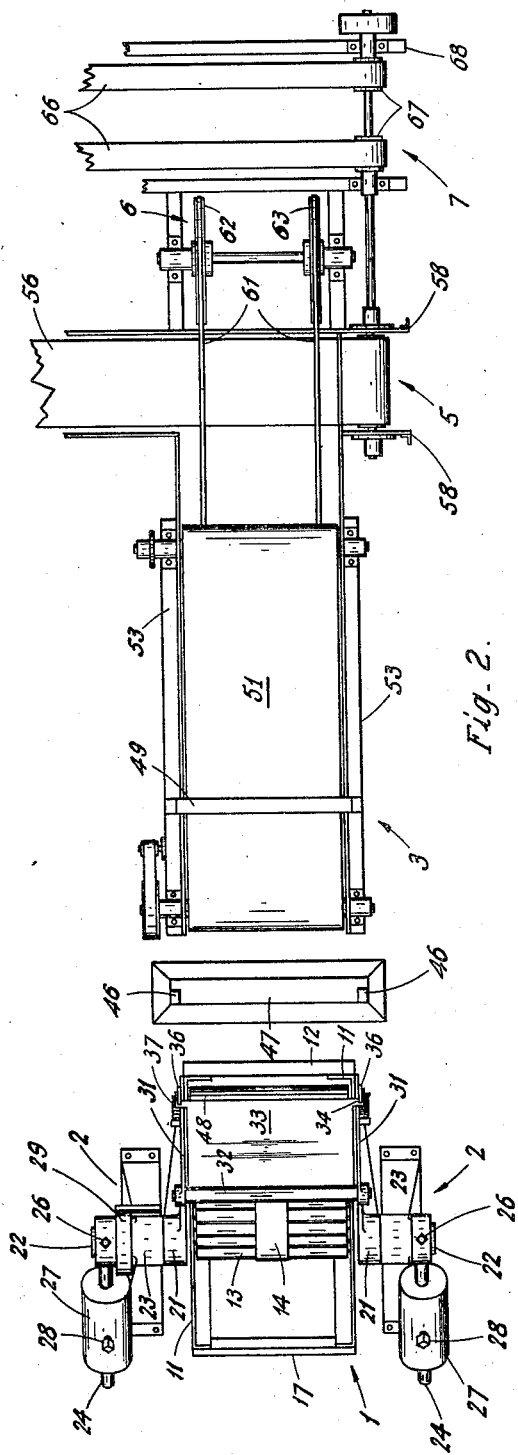
INVENTOR.
Albert. R. Thompson.
BY
ATTORNEY.

Patented Sept. 12, 1939

2,172,685

UNITED STATES PATENT OFFICE 2,172,685

STACK DUMPER

Albert R. Thompson, Los Gatos, Calif., assignor to Food Machinery Corporation, San Jose, Calif., a corporation of Delaware Application October 13, 1936, Serial No. 105,386

16 Claims. (Cl. 214—1.1)

My invention relates to box dumping machines, and is more particularly concerned with the provision of a machine of this character for handling commodity filled boxes or other containers in stacks, and operable to dump the stacked boxes and discharge them separately from the contents dumped therefrom, in an expeditious manner.

My invention is especially useful in connection with the packing industry, more particularly with the handling of fruit incident to its processing at packing houses, canneries and the like. Fruit is usually received from the grower in open or unlidded boxes, and it has been found convenient to handle fruit in such boxes for certain purposes, such as temporary storage, ripening, color treatment, etc. If, for example, boxes of fruit are stacked in ripening rooms, it is a common practice to convey such boxes to and from their stacked positions in stacks, the handling of fruit boxes by operatives in quantities less than an entire stack being avoided whenever feasible. Therefore, in removing fruit from the boxes, it has been found desirable to, and mechanisms have been devised, capable of receiving an entire stack of boxed fruit, which mechanisms, without further attention or manual assistance upon the part of operatives, remove the fruit from the boxes, as by dumping, and direct it by suitable means to the conveyor belts for carriage thereby to processing points. Known machines of the above character, while more or less satisfactory in operation, have been of complicated structure, and of such expensive nature that they have not gone into widespread use.

I have devised an improved machine of this general character which is inherently simple and rugged in construction as well as efficient in its operation, and which provides for receipt of stacked boxes in normal upright position and for subsequent automatic positioning of each entire stack of boxes for discharge in a file to conveying means for separating the fruit from the boxes.

It is a general object of my invention to provide an improved box stack dumper for handling stacks of commodity containers or boxes in such manner as to remove the commodities therefrom.

Another object of my invention is to provide an improved machine of the character referred to which handles each stack of boxes as a unit without reference to individual boxes.

Another object of my invention is to provide an improved machine of the character referred to which is of simple and economical construction and operates efficiently with a minimum of attention.

Another object of my invention is to provide an improved machine of the character referred to which attains the foregoing objects, and which is adjustable to handle boxes of varying weights.

Further objects of my invention will become apparent upon reference to the following description of a preferred embodiment thereof, reference therein being had to the accompanying drawings, in which:

Fig. 2 is a plan view of the machine; and

Fig. 3 is an enlarged sectional detail view, taken in the plane of line 3—3 of Fig. 1.

Figure 1:
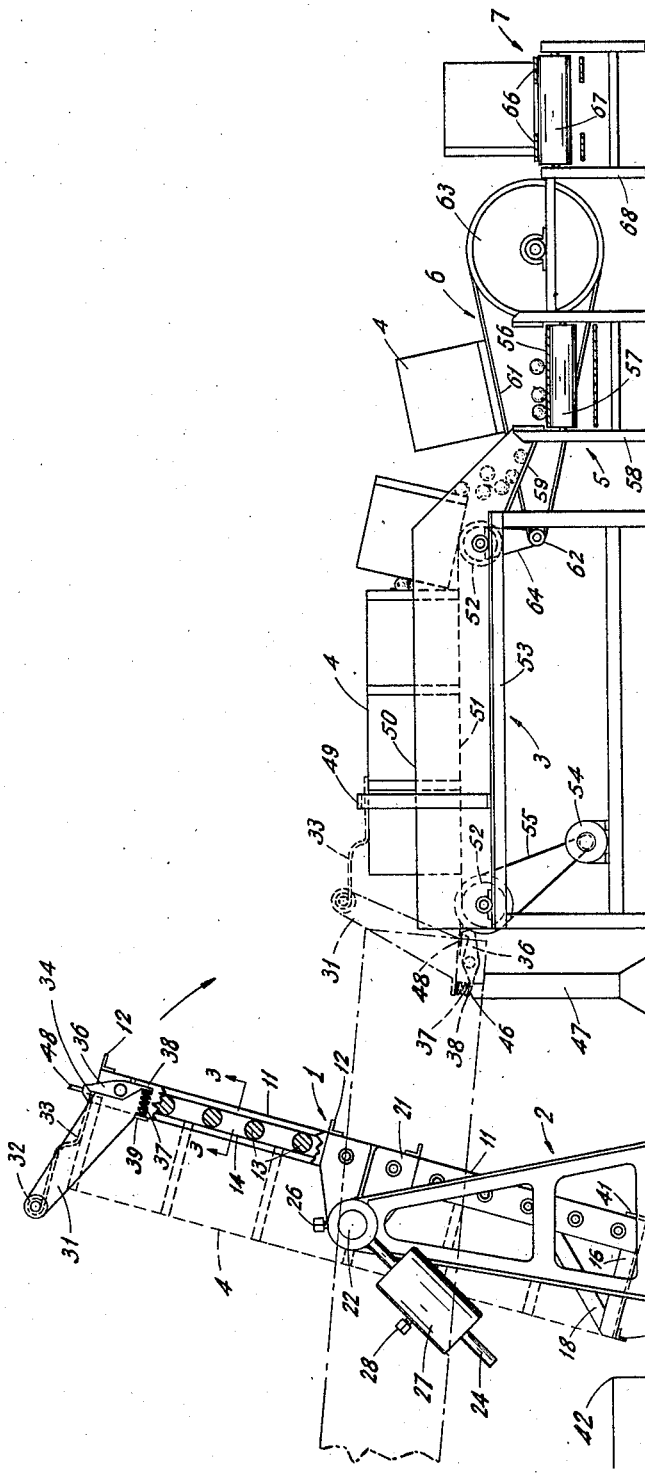
Fig. 1 is a side elevation of the machine, parts thereof being broken away to show certain structural details.

Generally, the box dumping machine of my invention includes box stack receiving and dumping means in the form of rack 1 which is pivotally supported intermediate its ends on standards 2 for tilting movement after the fashion of a see-saw, from the erect loading position thereof shown in full lines in Fig. 1, to the generally horizontal discharging position thereof, shown in dotted lines. In such discharging position, rack 1 is aligned with a belt conveyor 3 which translates the boxes 4 in a file to the unloading or dumping position thereof, where the contents of each box, such as fruit, is dumped gently onto a transversely extending fruit conveyor 5 as the box is supported thereabove by a transfer conveyor 6, which discharges the boxes onto a box conveyor 7 for suitable disposal.

Preferably rack 1 is constructed and mounted as described hereinafter, to normally assume and maintain a substantially upright loading position when empty, and to tilt automatically therefrom when loaded to a substantially horizontal discharging position to enable automatic discharge of the box stack as a file, such discharge being effected by a gravity conveyor forming the face or bottom of rack 1.

Rack 1 (Figs. 1 and 3) includes longitudinally extending side frame angles or rails 11 secured together in spaced parallel relation by a plurality of cross braces 12, and having idler rolls 13 extending between and journalled therein. Rolls 13 have endless belt 14 trained therearound to form therewith an endless gravity conveyor for a stack of boxes 4, (Figs. 1 and 2) which are received (initially) on a supporting ledge at the lower end of rack 1 with their sides engaging belt 14. The supporting ledge is formed by spaced apart angle arms 16 secured to and projecting outwardly from respective side members 11. At their outer ends, arms 16 are connected by cross angle 17, and each arm 16 is reinforced by a brace 18.

The rack 1 is pivotally supported intermediate its ends by means of forwardly projecting brackets 21 secured to the side rails 11 and provided with laterally projecting trunnions 22 which are journalled in bearings 23 formed on the upper ends of the supporting standards 2. The trunnions 22 project through the bearings 23, and weight arms 24 secured to their outer ends, as by collars 25 and set screws 26, carry counterpoises 27 which are slidably mounted on the weight arms and held in adjusted position by set screws 28.

By the construction just described, and as best seen in Fig. 1, the mounting of the rack 1 is such that its longitudinal axis, and consequently its center of gravity also, is offset to the rear of its pivotal axis so that the tendency of the rack would be to rotate in a clockwise direction into horizontal position were it not for the action of the counterpoises 27 which overcome the unbalanced condition of the rack to normally hold it in upright load receiving position as shown, where it is held slightly inclined from the vertical by a stop 41 for a purpose presently to become apparent. In this position of the rack, stacks of boxes to be dumped may be delivered thereto in any suitable manner, as, for example, by means of a hand truck or floor conveyor (not shown) operated to deliver the boxes from the edge 42 of the floor adjacent the lower floor level on which the stack dumper rests.

Upon delivery of a stack of boxes to the rack it will be apparent that, due to the inclination of the rack, the weight distribution of the load of boxes will overbalance the upper end of the rack so as to overcome the effect of the counterpoises, whereupon the rack automatically rotates in a clockwise direction, its momentum carrying it slightly beyond horizontal into load discharging position as indicated by dotted lines in Fig. 1, where its movement is arrested by means presently to be described, and the file of boxes gravitates off the rack over the conveyor formed by the rolls 13 and belt 14. The discharge of the boxes from the rack results in the counterpoises 27 again becoming effective to rotate it back in counter-clockwise direction into its normally upright position whereupon it is ready to receive another stack of boxes.

Thus it will be seen that the rack is fully automatic in its operation since the delivery of a stack of boxes thereto causes it to rotate automatically into its horizontal load discharging position where the boxes are automatically discharged, and it thereupon returns automatically to its upright load receiving position.

It will be observed that the construction and arrangement of the rack and associated counterpoises is such that the maximum turning moment is applied to the rack at the beginning of its movement away from either of its extreme positions when the frictional resistance to starting and inertia of the parts is to be overcome. The turning moment progressively decreases as the rack approaches its limit of travel where it is to be brought to rest, but preferably a rotary type dash pot 29 (see Fig. 2) which may be of conventional construction, is operatively associated with one of the trunnions 22 and its bearing 23 to retard or damp the movement of the rack whereby to prevent it from operating too rapidly so as to reduce the force of impact at its opposite limits of movement whereby to avoid injury to the mechanism or the contents of the boxes. It may also be observed that by adjustment of the counterpoises 27 the amount of unbalanced weight distribution effected thereby may be varied at will to adjust the sensitivity of the rack as well as to provide uniformity of action with loads of varying weight, as where it is desired to use the apparatus for dumping boxed products of varying kinds.

Rack 1 is provided with means cooperable with the top box of a stack during movement of the rack from loading to discharging position to retain the fruit in the box and hold the stack in position until the rack reaches its discharging position. To this end, a pair of brackets 31 are secured to side members 11 at the forward or discharge end of rack 1, and at their upper ends provide a pivotal support for hub 32 of retaining gate 33. At its lower end, gate 33 has projecting ears 34 which extend laterally beyond brackets 31 to limit inward movement of gate 33 and to cooperate with respective latch dogs 36. Each latch dog 36 is pivoted on a bracket 31 and is urged to latching position by spring 37 compressed between tail 38 thereof and spring seat 39 on bracket 31. Latch dogs 36 are released at the discharging position of rack 1 as described hereinafter. It will be noted that the upper part of gate 33 is offset outwardly and that hub 32 is supported by brackets 31 away from top box 4 to provide ample clearance for loading of a stack of boxes. At the same time, gate 33 and brackets 31 effectively hold the stack in position and prevent loss of fruit from the top box during tilting of the rack to its discharge position.

Means are provided for arresting the loaded rack in its generally horizontal discharging position and simultaneously releasing the retaining gate. Loaded rack 1 upon reaching the discharging position, is arrested by stationary stops 46 projecting upwardly from stop bracket 47 to engage tails 38 of latch dogs 36 and unlatch retaining gate 33. Immediately upon such unlatching of gate 33, the boxes are released and the end box forces gate 33 upwardly as the file of boxes is conveyed to the right over discharge platform 48 at the discharge end of the now functioning gravity conveyor, comprising rolls 13 and belt 14. It will be observed that belt 14 serves to prevent relative movement of the boxes as they progress on the conveyor. In this way the file of boxes are kept together so that the bottoms of the leading boxes act as lids upon the following, thus preventing premature escape of the contents. It will also be noted that during the discharge of boxes from rack 1, the latter continues to be held in unloading position by such boxes as remain on the rack until the last box has left the rack, it being appreciated that the weight of one box at the discharge of the rack will ordinarily be sufficient to effect this end. However, to insure this condition of the parts, retaining bar 49 may be mounted on conveyor 3 to overlie gate 33 and retain rack 1 in discharging position until the last box 4 of a stack has moved out from under gate 33.

While it will be understood that the boxes may be directly tilted over a fruit runway to remove the friut therefrom as they leave the rack 1, suitable means being provided as hereinafter described for the purpose of disposing of empty boxes, it is desirable to control the rate at which fruit enters the runway to prevent the piling up of fruit on and the overloading of the conveyors. I prefer to effect this control by means of a belt type file conveyor 3 which is disposed in alignment with gate 33 and rack 1 in its unloading position and in substantial continuation of platform 48. File conveyor 3 comprises conveyor belt 51 suitably mounted about drums 52 journalled adjacent the ends of frame 53 and driven at a desired constant speed from motor 54 by pulley and belt connection 65. Belt 51 is wide enough to support the entire box and is flanked by guards 60 mounted on frame 53 at either side of belt 51 to retain spilled fruit thereon. As the file of boxes leaves rack 1 by sliding over platform 46 and riding onto conveyor belt 51, the file of boxes immediately takes the speed of the latter, which is preferably less than the speed at which the boxes would otherwise leave rack 1. This condition insures adjacent boxes remaining together as they leave rack 1 to prevent spilling of fruit.

As described previously, boxes 4 are dumped as they leave transfer conveyor 3, the fruit being received by fruit conveyor 5, and the empty boxes being received by box conveyor 6 therefor. Fruit conveyor 5 is of conventional construction and includes belt 56 travelling over rollers 57 journalled on frame 58. To provide for gentle handling of the fruit, runway 59 extends from beneath the discharge end of file conveyor 3 to belt 56 extending transversely thereof.

Transfer conveyor 6 comprises a pair of V-belts 61 trained over respective pairs of pulleys 62, 63 and spaced apart a distance slightly less than the box length and underlying the discharge end of file conveyor 3 so as to permit the boxes to fall thereon in inverted position and be carried thereby. Preferably, V-belts 61 are positioned beneath the end walls of the boxes so that all fruit and the like will be discharged therebetween. V-belts 61 may pass through openings in fruit runway 59 as shown and be driven at a speed substantially greater than that of file conveyor 3 through pulley-belt drive 64 from a drum 52 so as to move emptied boxes rapidly out of the path of oncoming fruit and boxes. From transfer conveyor 6, the empty boxes are dumped on box conveyor 7 for suitable disposal thereof. Conveyor 7 comprises spaced belts 66 trained over rollers 67 on frame 68 and driven in any suitable manner.

In operation, it being assumed that the apparatus is properly adjusted for the type of fruit being handled, the stacks are wheeled or conveyed to and deposited in rack 1 in the erect or loading position thereof by means such as a conventional hand truck or floor conveyor, (not shown). Thereupon the loaded rack automatically rotates to discharging position under the weight of the load thereon. It is desirable to point out that gate 33 acts as a lid for the fruit in the topmost box, to retain the fruit therein as the stack tilts toward horizontal.

As the rack 1 reaches unloading position, gate 33 is immediately released and the foremost box forces gate 33 upward and against bar 49, thus preventing return movement of rack 1 until complete unloading thereof. Concurrently, the fruit in the foremost box is partially spilled on belt 51 of conveyor 3. The foremost box moves along with belt 51, being pushed by the remaining boxes on belt 14 and gravity rolls 13.

As is evident, the boxes remain together as a file in the same relation as when stacked as they progress on transfer conveyor 51 and except as to the foremost box, no fruit is spilled until just before runway 59 is reached and when the preceding box is dumped. At the discharge end of file conveyor 3, the contents of the several boxes are successively dumped down runway 59 to belt 56 of fruit conveyor 5, and the boxes travel on V-belts 61 of transfer conveyor 6 onto belts 66 of box conveyor 7.

As the last box rides from undergate 33, rack 1 is free to rotate back to its loading position, by virtue of its unbalanced weight distribution, to receive another stack of boxes.

From the above description, it is seen that I have provided simple automatic means for handling stacks of boxes and the like to move the stack from a vertical or storing position to a horizontal or handling position, in which they can readily be unloaded or conveyed away. It is to be noted that the operation is entirely automatic, and all that is required of the operative is to repeatedly load stacks of boxes or the like onto the machine.

Having explained the principles of my invention and having described and illustrated by drawings a preferred construction which gives useful effect thereto, it will be appreciated that my invention may be otherwise embodied by those skilled in the art without departing from the spirit thereof. For example, it will, therefore, be understood that I consider myself entitled to all such modifications and equivalents as rightfully lie within the purview of the appended claims.

I claim as my invention:

1. A machine for handling stacked boxes, comprising a rack mounted for movement about a pivotal axis intermediate its length between a substantially upright stack loading position and a substantially horizontal stack discharging position, said rack having an unbalanced weight distribution tending to effect movement thereof to said loading position.

2. A machine for handling stacked boxes, comprising a rack mounted for movement about a pivotal axis intermediate its length between a substantially upright stack loading position and a substantially horizontal stack discharging position, said rack having an unbalanced weight distribution tending to effect movement thereof to said loading position and including means for varying the unbalance of said weight distribution.

3. A stacked box handling machine comprising a pivotally mounted box stack receiving rack having its pivotal axis located intermediate the ends thereof and having an unbalanced weight distribution with respect to its pivotal axis to effect self-actuation of said rack when empty to a substanially upright stack receiving position and to effect tilting of said rack under the weight of a stack of boxes delivered thereto into a substantially horizontal stack discharging position.

4. A stacked box handling machine comprising a box stack receiving rack pivotally mounted intermediate its ends and having a gravity conveyor supported thereon and extending longitudinally thereof, said rack also having an unbalanced weight distribution with respect to its pivotal axis to effect self actuation of said rack when empty to a substantially upright stack receiving position to receive a stack of boxes at one level and to effect tilting of said rack under the weight of a stack of boxes delivered thereto into a substantially horizontal position to enable operation of said gravity conveyor to discharge the boxes as a file at a higher level.

5. In combination, a rack for receiving boxes in stacked relation, and means pivotally supporting said rack about an axis intermediate the ends thereof and eccentric to the weight distribution of said rack both when empty and when loaded to provide for movement of said rack when empty to an upright loading position, and to provide for movement of said rack when loaded to a position tilted slightly from the horizontal, said rack including a gravity conveyor operable in said discharging position.

6. In combination, a rack for receiving boxes in stacked relation, and means pivotally supporting said rack about an axis intermediate the ends thereof and eccentric to the weight distribution of said rack both when empty and when loaded, to provide for movement of said rack when empty to an upright loading position, and to provide for movement of said rack when loaded to a substantially horizontal discharging position, said rack having an adjustable counterpoise thereon to adapt said rack for use with stacks of boxes of varying weight.

7. A machine for handling unlidded stacked boxes, comprising box stack handling means mounted for movement to and from stack loading and stack discharging positions and arranged to receive and handle a box stack as a unit, said box stack handling means including a ledge for engaging the bottom of a stack, a conveyor for engaging a side of a stack, and closure means for engaging the top box of a stack positioned in said box stack handling means.

8. A machine for handling unlidded stacked boxes, comprising box stack handling means mounted for movement to and from stack loading and stack discharging positions and arranged to receive and handle a box stack as a unit, said box stack handling means including a retaining gate for engaging the top of a stack and forming a closure for the top box of a stack.

9. A machine for handling unlidded stacked boxes, comprising a pivotally mounted stack receiving rack tiltable from an upright stack receiving position to a substantially horizontal stack discharging position, a gate for closing the top box of a stack in said rack, a latch for retaining said gate in operative position, and means operable upon movement of said rack to discharging position for releasing said latch.

10. In a machine for handling unlidded stacked boxes, a stack receiving rack movable between stack receiving and stack discharging positions, a gate for closing the top box of a stack in said rack, a latch for retaining said gate in operative position, and a stop for determining the discharging position of said rack, said stop having means engageable with said latch to effect release thereof.

11. In a stacked box handling machine, a rack for receiving stacked boxes in upright position and for repositioning said boxes to rest on their sides in discharging position, means for discharging said boxes from said rack, and means controlled by boxes as they are removed from said rack for retaining said rack in discharging position.

12. In an apparatus for handling unlidded stacked boxes of articles, a pivotally mounted gravity conveyor for receiving a stack of boxes in substantially upright position at a loading level and being tiltable to a substantially horizontal position to discharge said boxes as a file at a higher level and with their open ends foremost, a horizontally disposed file conveyor for receiving files of boxes from said gravity conveyor, and means for driving said file conveyor to control the rate of discharge of boxes from said gravity conveyor whereby the boxes of each file move onto said file conveyor without affecting their closely spaced article retaining positions in the file.

13. In a stacked box handling machine, conveyor means, means for driving said conveyor means, means comprising a conveyor for receiving a stack of boxes in upright position, said conveyor being movable between stack receiving and stack discharging positions and being operable to unstack said boxes for delivery to said conveyor means and to convey said boxes to said conveyor means, means for retaining said boxes on said conveyor pending such delivery, means for releasing said retaining means at said delivery position, and means engageable with said retaining means for maintaining said conveyor in delivery position until unloaded.

14. In an apparatus for handling unlidded stacked boxes of articles, a pivotally mounted gravity conveyor for receiving a stack of boxes in substantially upright position at a loading level and being tiltable to substantially horizontal position to discharge said boxes as a file at a higher level and with their open ends foremost, a horizontally disposed file conveyor for receiving files of boxes from said gravity conveyor and for controlling the rate of discharge of boxes from said gravity conveyor whereby the boxes of each file move onto said file conveyor without affecting their closely spaced article retaining positions in the file, an article conveyor disposed below the discharge end of said file conveyor, and a box transfer conveyor above said article conveyor and below the discharge end of said file conveyor for receiving boxes in inverted position therefrom as the articles fall onto said article conveyor.

15. In an apparatus for handling unlidded stacked boxes of articles, a pivotally mounted gravity conveyor having its center of gravity adjacent its pivotal axis to provide an unbalanced weight distribution to determine self-actuation of said conveyor when empty to a substantially upright stack receiving position at a loading level and to effect tilting of said conveyor under the weight of a stack of boxes to substantially horizontal position to discharge said boxes as a file at a higher level and with their open ends foremost, a horizontally disposed file conveyor for receiving files of boxes from said gravity conveyor and for controlling the rate of discharge of boxes from said gravity conveyor whereby the boxes of each file move onto said file conveyor without affecting their closely spaced article retaining positions in the file, an article conveyor disposed below the discharge end of said file conveyor, and a box transfer conveyor above said article conveyor and below the discharge end of said file conveyor for receiving boxes in inverted position therefrom as the articles fall onto said article conveyor.

16. In combination, a rack for receiving boxes in stacked relation, and means pivotally supporting said rack about an axis intermediate the ends thereof and offset outwardly from the box engaging surface of said rack, said rack when empty having its center of gravity eccentric with respect to said axis to provide a moment acting on one end of said rack tending to move said rack to substantially upright stack receiving position, and said rack when loaded having its center of gravity shifted by the stack of boxes to provide a moment acting on the other end of said rack tending to move said rack to stack discharging position.

ALBERT R. THOMPSON.